UNITED STATES PATENT OFFICE.

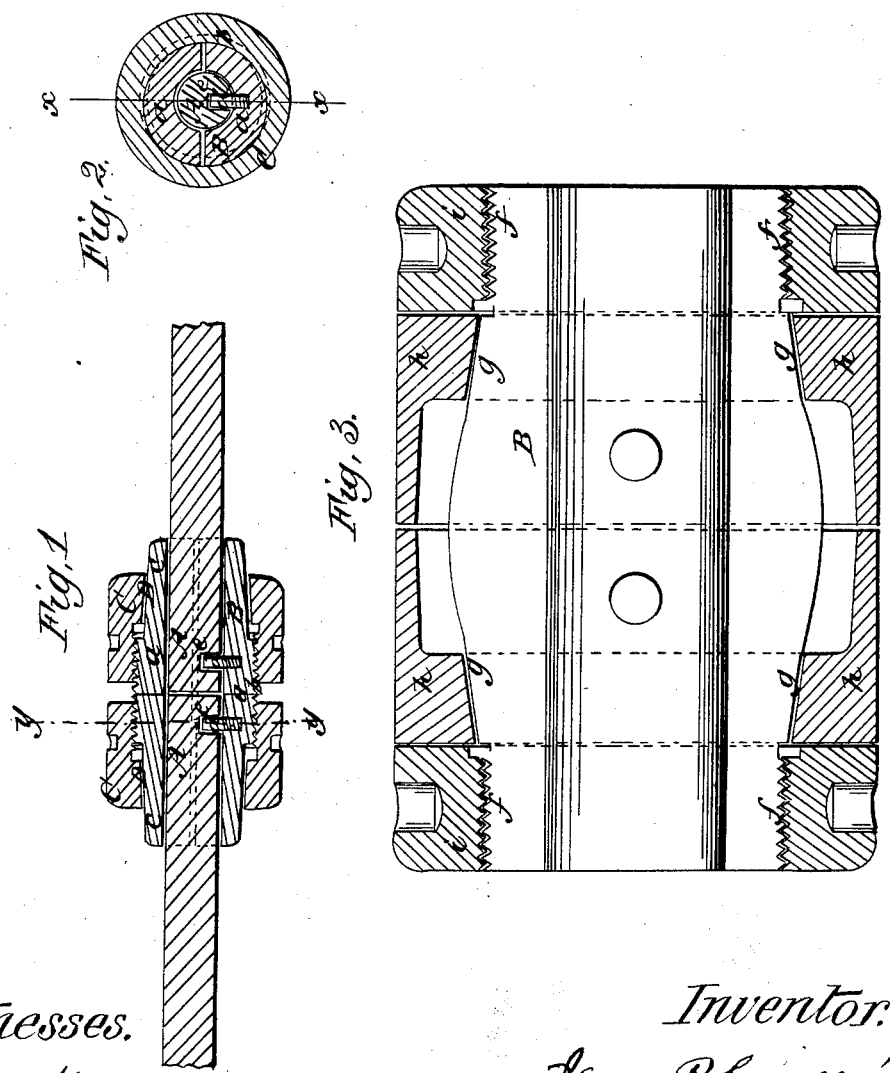

JAMES P. COLLINS, OF TROY, NEW YORK.

IMPROVEMENT IN SHAFT-COUPLINGS.

Specification forming part of Letters Patent No. 45,476, dated December 20, 1864.

*To all whom it may concern:*

Be it known that I, JAMES P. COLLINS, of Troy, in the county of Rensselaer and State of New York, have invented a new and Improved Shaft-Coupling; and I do hereby declare that the following is a full, clear, and exact description thereof, which will enable any person skilled in the art to make and use the same, reference being had to the accompanying drawings, making a part of this specification, in which—

Figure 1 represents a longitudinal central section of my invention, taken in the line $x\,x$, Fig. 2; Fig. 2, a transverse section of the same, taken in the line $y\,y$, Fig. 1; Fig. 3, a longitudinal central section of a modification of the same.

Similar letters of reference indicate like parts.

This invention relates to a new and improved coupling for shafting; and it consists in the employment or use of a divided collar provided with one or more screws or screw-threads and conical surfaces on its exterior, in connection with nuts and female cones or thimbles having conical interiors to work on the conical surfaces of the divided collar, all being arranged in such a manner that shafting may be securely connected with the greatest facility, and also secured together in line—one shaft with another—thereby avoiding much trouble hitherto experienced in putting up the shafting of machinery.

A A represent the ends of two shafts; and B, Figs. 1 and 2, is a collar formed of two equal longitudinal parts, $a\,a$, which are fitted on the ends of the shafts, but are not allowed to come in close contact with each other at their sides, a space being allowed to admit of the two parts, $a\,a$, being pressed firmly around the shafts to hug the same firmly. At the center of the collar B there is a screw-thread, $b$, which is cut on a cylindrical portion of the collar. The collar at each side of the screw is of taper or conical form, as shown clearly at $c\,c$ in Fig. 1.

C C represent two nuts, which work on the screw $b$. These nuts at their outer parts are provided with an internal or female conical surface, D, which works over the conical parts $c\,c$ of the collar B.

From the above description it will be seen that when the nuts C C are screwed up on the thread or screw $b$ the internal conical parts D of the nuts which work over the conical surfaces $c\,c$ of the collar will bind or press the two parts $a\,a$ of the latter snugly against the shafts and cause the same to be firmly coupled together in line with each other.

If necessary or desired pins, $d\,d$ may be driven into one of the parts $a$ of the collar to fit in recesses $e$ in the shafts A and prevent any longitudinal play or movement of the latter.

In Fig. 3 a modification of the invention is shown. In this case, instead of having a screw cut centrally on the collar B, a screw, $f$, is cut on each end of it on cylindrical surfaces, the conical surfaces being at the central part of the collar, as shown at $g\,g$, and instead of having the female or internal cones at the outer parts of the nuts they are made detached from the latter and fitted on the conical surfaces $g\,g$ at the inner sides of the nuts, as shown at $h\,h$. By this arrangement it will be seen that by screwing up the nuts $i\,i$ on the screws $f$ the female cones $h\,h$ will be forced toward the center of the collar and made to press the two parts $a\,a$ of the same in close contact with the shaft. This modification I consider preferable for coupling large shafting, and it possesses the advantage of admitting of the coupling serving as a pulley, as it may have an unbroken cylindrical surface the whole length of the collar.

I claim as new and desire to secure by Letters Patent—

A divided collar provided with one or more screw-threads and two conical surfaces on its exterior, in connection with nuts and female cones, all arranged to form a new and improved coupling for shafting, substantially as set forth.

J. P. COLLINS.

Witnesses:
    E. D. W. WOOD,
    L. D. GAY.